United States Patent
Cheok et al.

(10) Patent No.: US 6,732,280 B1
(45) Date of Patent: *May 4, 2004

(54) COMPUTER SYSTEM PERFORMING MACHINE SPECIFIC TASKS BEFORE GOING TO A LOW POWER STATE

(75) Inventors: Paul Poh Loh Cheok, Singapore (SG); Lan Wang, Singapore (SG); Woon Jeong Lee, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,061

(22) Filed: Mar. 30, 2000

(30) Foreign Application Priority Data

Jul. 26, 1999 (SG) .............................. 9903600

(51) Int. Cl.⁷ .............................. G06F 1/26; G06F 1/32
(52) U.S. Cl. ...................... 713/300; 713/320; 713/324
(58) Field of Search .................. 713/300, 320, 713/324, 340

(56) References Cited

U.S. PATENT DOCUMENTS

| 4,748,587 | A | * | 5/1988 | Combes et al. ................ 714/55 |
| 5,689,714 | A | * | 11/1997 | Moyer ......................... 713/310 |
| 5,878,264 | A | * | 3/1999 | Ebrahim ...................... 713/323 |
| 5,919,263 | A | * | 7/1999 | Kikinis et al. ............... 713/320 |
| 6,105,142 | A | * | 8/2000 | Goff et al. ................... 713/324 |
| 6,343,051 | B1 | * | 1/2002 | Yabe et al. .................... 368/64 |
| 6,345,362 | B1 | * | 2/2002 | Bertin et al. ................. 713/300 |
| 6,360,327 | B1 | * | 3/2002 | Hobson .................... 264/210.2 |
| 6,393,572 | B1 | * | 5/2002 | Datta et al. .................. 713/322 |
| 6,405,320 | B1 | * | 6/2002 | Lee et al. .................... 713/300 |

FOREIGN PATENT DOCUMENTS

JP 06242860 A * 9/1994 ............. G06F/1/28

* cited by examiner

Primary Examiner—Thomas Lee
Assistant Examiner—Mark Connolly

(57) ABSTRACT

A computer system having an Advance Configuration and Power Interface-compliant, or ACPI, operating system performs certain machine specific tasks before going to a low power state. When the computer operating system indicates that entry into the low power state is desired, a microcontroller embedded in an input/output chip is alerted. Synchronization between the main processor of the computer system and the embedded microcontroller of the ACPI operating system is achieved, reducing the likelihood of system failure on the next boot operation. The embedded microcontroller then also causes the state of devices connected to the input/output chip to be saved. This helps the machine to go to a known state during the resume process.

21 Claims, 9 Drawing Sheets

PM1a, PM1b CONTROL REGISTER

| BIT 15;14 | BIT 13 | BIT 12-10 | BIT 9-3 | BIT 2 | BIT 1 | BIT 0 |
|---|---|---|---|---|---|---|
| Reserved | Suspend Enable Bit SUS_EN | Suspend Type Field SUS_TYP | Reserved | Global Release Bit | Bus Mater Reload Enable Bit | SCI Enable Bit SCI_EN |

*FIG. 4*

COMPUTER SYSTEM PERFORMING MACHINE SPECIFIC TASKS BEFORE GOING TO A LOW POWER STATE

BACKGROUND OF THE INVENTION

1. Field of the Invention

The present invention relates to computer systems, and more specifically to personal computers that include an advance configuration and power interface, or ACPI, operating system.

2. Background of the Related Art

The Advanced Configuration and Power Interface (ACPI) has been developed for power management in computer systems. The ACPI was intended to replace earlier power management techniques, including both the plug-and-play (PnP) and the Advanced Power Management (APM) Systems, and has been said to virtually eliminate the need for a system Basic Input/Output System (BIOS) to configure a computer system. The ACPI operating system was thus planned to perform all of the functions previously performed by plug-and-play (PnP) and the Advanced Power Management (APM) Systems, reducing the system Basic Input/Output System to a small collection of routines callable from the operating system.

With ACPI, it was determined to relegate to the operating system various functions that previously had been performed by the Basic Input/Output System or BIOS. Traditionally, when power was applied to a computer system, its Basic Input/Output System executed immediately. The BIOS for the computer system typically resided in ROM or PROM (and was therefore difficult to modify) or in an Initial Program Load (IPL) device that could not be disabled.

The BIOS for the computer system has, so far as is known, included firmware that configured the computer system, and provided a variety of other functions. In addition to the computer system BIOS, there were often other, separate Basic Input/Output Systems contained in the power management software techniques. In many PnP and APM systems, following the execution of the computer system BIOS, both a Plug-and-Play BIOS and an Advanced Power Management BIOS, each with related utilities, executed. The Plug-and-Play BIOS was separate from that of the computer system, and re-configured the system either dynamically or statically to allow the operating system to initialize.

The Advanced Power Management controlled system power, including sleep states and power states. The Advanced Power Management BIOS was also separate from both that of the computer system BIOS and the PnP BIOS. ACPI has begun to replace both the Plug-and-Play BIOS and Advanced Power Management BIOS, and other system initialization functionality. This has been done by providing operating systems and a platform/device interface that can perform these tasks in a more centralized manner. However, to function properly, ACPI also required compliant platform hardware. Thus, certain ACPI compatible hardware interface requirements have been imposed on computer manufacturers, so that all devices would be compatible with the ACPI compatible operating systems. Thus, from the perspective of the manufacturer, the ACPI specification may be considered as a hardware interface specification.

One of the most significant advances of ACPI has been the ability of the operating system to control system power states. Before ACPI, power management had been platform-specific, typically implemented in hardware or in the computer system BIOS code. ACPI has allowed portable, platform or independent operating systems to control hardware power states on a system-wide basis. ACPI defined a number of low-power states in which the operating system could place the computer system.

The ACPI specification required certain hardware components and extensions to facilitate the hardware interface. Typically an embedded microcontroller was one of these required hardware components. This embedded microcontroller was in effect a stand-alone processor in each ACPI-compliant peripheral device that worked hand-in-hand with the main processor of the computer system. One of the other additional hardware extensions necessary under the ACPI specification has been that of general purpose power-management registers. The power-management registers controlled the power state of the computer system. An ACPI-compatible operating system running on the processor of the computer system wrote instructions defining a power state for at least some of these registers. The ACPI compliant operating system controlled a variety of system-wide features, such as enabling and disabling interrupt sources, controlling the amount of power provided to various buses and devices, and restoring the computer system from low power states, such as sleep-mode and soft-off mode. For example, if the operating system desired to put the computer system in a sleep mode, the operating system wrote a "prepare to sleep" command to the registers. The operating system then issued an enable signal for certain of the registers, which caused an appropriate enable bit to be set in the registers. After the "prepare to sleep" instruction was sent and the registers were enabled, the computer system transitioned to whatever low-power state the operating system commanded.

Unfortunately, even if the main processor was ACPI-compliant, the embedded microcontroller might not be. Thus, while the operating system might command a low power state for the computer system, certain peripheral devices with incompatible microcontrollers would not go to the low power state. In addition, if the peripheral device was not capable of processing a command to enter a low power state, then the associated microcontroller for that device would not change state. Thus, the sleep states were not entered or exited with well defined synchronization of the main processor and the embedded microcontrollers, particularly since the embedded controller has, so far as is known, been controlled by a "general purpose event" status register bit.

SUMMARY OF THE INVENTION

Briefly, the present invention provides a new and improved computer system to perform machine specific tasks before going to a low power state. The computer system has a host processor under control of an operating system, preferably one programmed according to the advance configuration and power interface, or ACPI, allowing the operating state and at least one low power or sleep state. The computer system also has at least one device containing a microcontroller which normally runs independently of the host processor. When the host processor receives a command to transition to a low power state, the microcontroller is notified. The microcontroller can then also transition to the lower power state, or it may shut down. At this time, the system can perform custodial or housekeeping functions, causing devices in the system to save their present states. Thus, the host processor and microcontroller are synchronized. Also, on restart the computer system can return at a known state.

BRIEF DESCRIPTION OF THE DRAWINGS

A better understanding of the present invention can be obtained when the following detailed description of the preferred embodiment is considered in conjunction with the following drawings, in which:

FIG. 4 is a schematic diagram of certain power management control registers in the computer system of FIG. 3.

DETAILED DESCRIPTION OF THE PREFERRED EMBODIMENT

Figure 1:
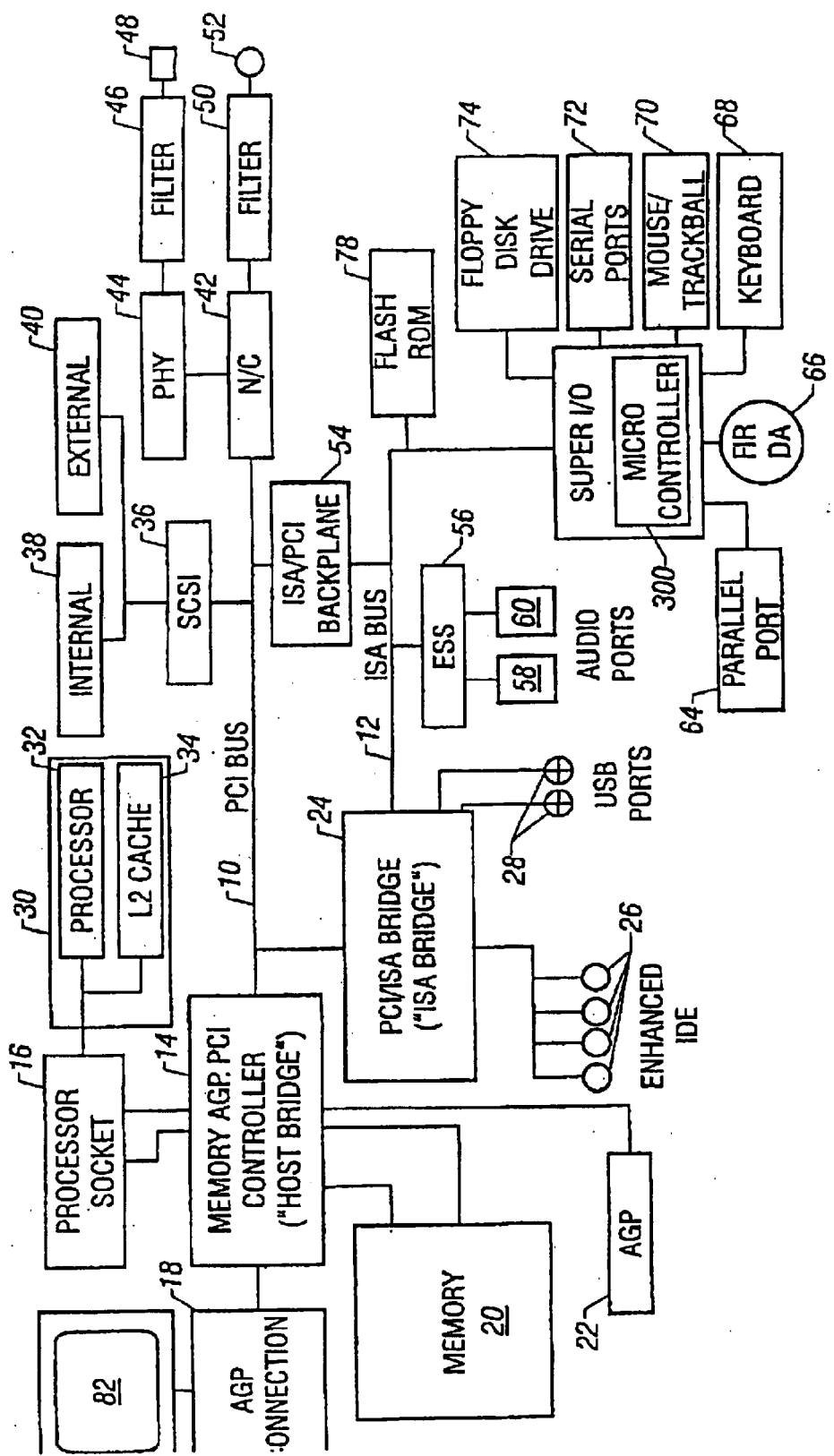
FIG. 1 is a schematic diagram of a computer system constructed according to the preferred embodiment of the present invention.

Turning to FIG. 1, illustrated is a typical computer system S implemented according to the invention. While this system is illustrative of one embodiment, the techniques according to the invention can be implemented in a wide variety of systems. The computer system S preferably comprises a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, a memory subsystem 20, and an AGP 22. Although not required, typically an AGP connector 18 may also be provided in the computer system S for connection of a video display 82. A second bridge circuit, a PCI/ISA bridge 24 (the AISA bridge=), bridges the PCI bus 10 and the ISA bus 12.

The host bridge 14 in the preferred embodiment comprises a 440LX Integrated Circuit by Intel Corporation, also known as the PCI AGP Controller (PAC). The ISA bridge 24 preferably comprises a PIIX4, also manufactured by Intel Corporation. The host bridge 14 and ISA bridge 24 provide capabilities other than bridging between the processor socket 16 and the PCI bus 10, and the PCI bus 10 and the ISA bus 12. Specifically, the host bridge 14 includes interface circuitry for the AGP connector 18 (when present), the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 preferably couples to the processor socket 16, which is preferably designed to receive a Pentium II processor module 30, which in turn includes a microprocessor core 32 and a level two (L2) cache 34. The processor socket 16 could be replaced with different processors other than the Pentium II without departing from the spirit of the invention.

The host bridge 14, when the Intel 440LX North Bridge or other suitable bridge is employed, preferably supports extended data out (EDO) dynamic random access memory (DRAM) and synchronous DRAM (SDRAM), a 64/72-bit data path to memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAM's. The host bridge 14 also preferably supports up to 66 megahertz DRAMs, whereas the processor socket 16 can support various integral and nonintegral multiples of that speed.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 comprises a AIC-7860 SCSI controller. Also coupled to the PCI bus 10 is a network interface controller (NIC) 42, which preferably supports the ThunderLan$^{TN}$ power management specification by Texas Instruments. The NIC 42 couples through a physical layer 44 and a filter 46 to an RJ-45 jack 48, and through a filter 50 to a AUI jack 52.

Between the PCI Bus 10 and the ISA Bus 12, an ISA/PCI backplane 54 is provided which includes a number of PCI and ISA slots. This allows ISA cards or PCI cards to be installed into the system for added functionality.

The ISA bridge 24 also provides enhanced power management. It supports a PCI bus at 30 or 33 megahertz and an ISA bus 12 at ¼ of the PCI bus frequency. Preferably, PCI revision 2.1 is supported with both positive and subtractive decode. The standard personal computer input/output (I/O) functions are supported, including, for example, a dynamic memory access (DMA) controller, two 82C59 interrupt controllers (?) an 8254 timer, a real time clock (RTC) with a 256 byte complementary metal oxide semiconductor (CMOS) 222 (?), static RAM (SRAM), and chip selects for system read only memory (ROM), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

In the preferred embodiment, the ISA Bus 12 further couples to an enhanced sound system chip (ESS) 56, which provides sound management through an audio in port 58 and an audio out port 60. The ISA bus 12 also couples the ISA bridge 24 to a Super I/O chip 62, which in the disclosed embodiment is a Standard Microsystem Corporation SMC952 device. This Super I/O chip 62 provides a variety of input/output functionality, including a parallel port 64, an infrared port 66, a keyboard controller for a keyboard 68, a port for a mouse or track ball 70, additional serial ports 72, and a floppy disk drive controller for a floppy disk drive 74. These devices are coupled in a conventional manner through connectors to the Super I/O 62.

Figure 3:
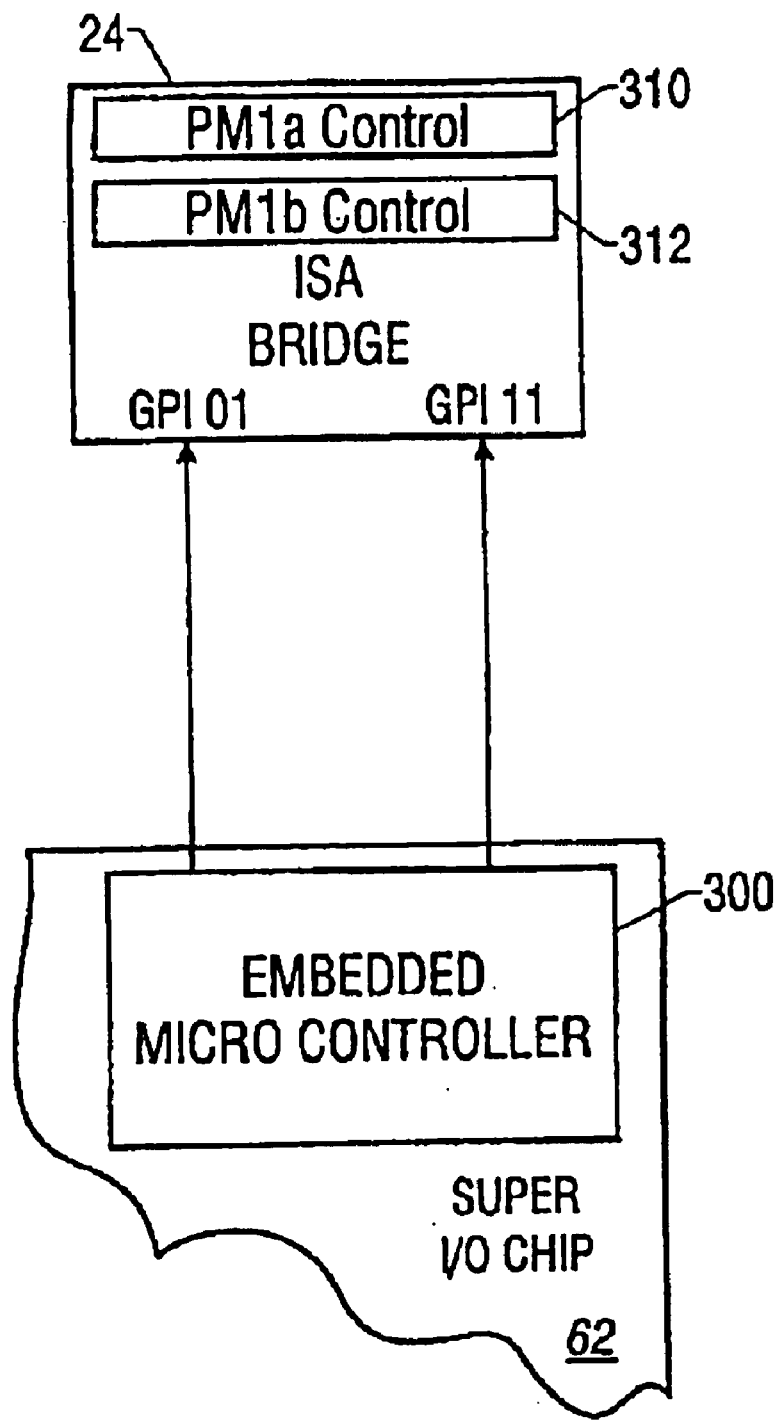
FIG. 3 is a more detailed schematic diagram of certain portion of FIG. 1, including an embedded microcontroller.

According to the preferred embodiment of the present invention, the super I/O 62 includes an embedded microcontroller 300 (FIGS. 1 and 3) which preferably comprises an SMC 951, 952 or 971, all of which are available from Standard Microsystem Corporation. As will be described below, the embedded microcontroller 300 provides runtime event signals and wakeup event signals on receipt of certain indications which occur during operation of the computer system S. The Super I/O chip provides a variety of miscellaneous functions for the system which includes security features, system power control, light emitting diode (LED) control, remote wake up logic, system fan control, hood lock control and support, system temperature control, and various glue logic.

The ISA bus 12 is also couples through bus transceivers 76 to a flash ROM 78, which can include both basic input/output system, such as BIOS 216 (FIG. 2) code for execution by the processor 32, as well as an additional code for execution by microcontrollers in a ROM-sharing arrangement.

Finally, a video display 82 can be coupled to the AGP connector 18 for display of data by the computer system S. The video display 82 displays video and graphics data provided by a video display process running on either the processor module 30 or a PCI device bus master (or PCI bridge device bus master) via host bridge 14. Video or graphics data may be stored in main memory or in a supplementary or extension memory module. Again, it should be understood that a wide variety of systems could be used instead of the disclosed system S without departing from the spirit of the invention.

Figure 2:
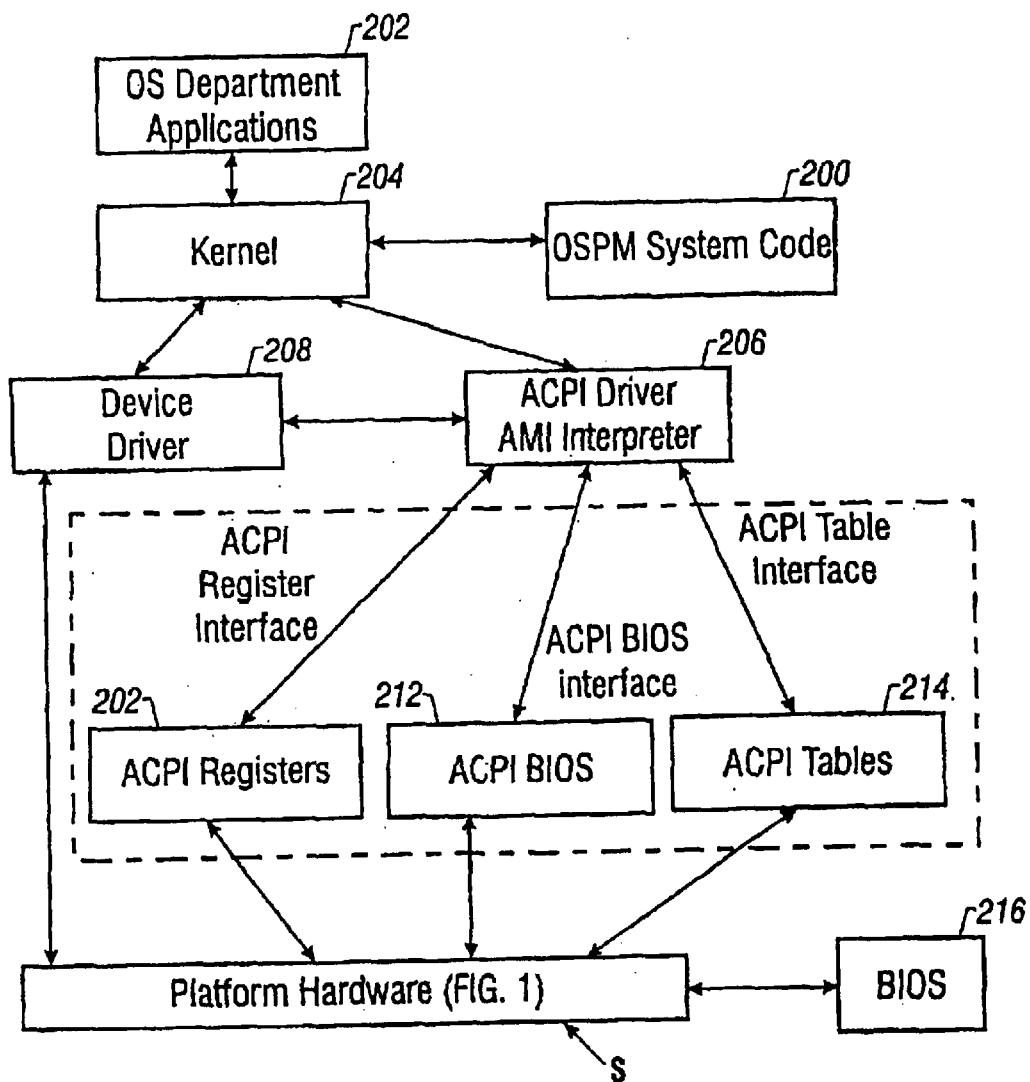
FIG. 2 is a schematic diagram of the advance configuration and power interface, or ACPI, operating system, including its operating system directed power management, for the computer system of FIG. 1.

Referring now to FIG. 2, a schematic diagram is shown of the computer system S of FIG. 1 in an ACPI environment. The computer system S of FIG. 1 is configured according to what is known as the ACPI Global System, including the operating system directed power management (OSPM) 200. Various operating system dependent software applications 202 run on a system interface through a kernel 204, with the operating system directed power management system code 200, and with an ACPI driver/machine language interpreter 206. Conventionally, this occurs according to a virtual machine language, compiled from ACPI Source Language, in which device control methods are written, and which is understandable to all ACPI-compatible operating systems. The device control methods are typically written by device manufacturers and provided to platform developers and manufacturers.

The operating system directed power management system code 200 and ACPI driver/machine language interpreter 206 operate in software within the microprocessor 30 on a system specific basis. The kernel 204 also interfaces with a device driver 208, also running in software on the microprocessor 30. Through the ACPI driver/machine language interpreter 206, the system code software 200 interfaces with ACPI registers 210, the ACPI Basic Input/Output System 212, and the ACPI tables 214, to the platform hardware (FIG. 1) and, through the platform hardware of FIG. 1, to the computer system BIOS 216. The computer system BIOS 216 is typically that associated with the Advanced Power Management and/or PnP. ACPI BIOS is part of computer system BIOS The ACPI registers 210, ACPI BIOS 212 and ACPI Tables 214 are independent of operating system technologies, interfaces, code and hardware.

The device driver 208 also allows conventional, standard register interfaces directly with the platform hardware of the computer system S (FIG. 1). The ACPI tables 214 describe the interface to the platform hardware. Although some controls are typically embedded in fixed blocks of ACPI registers 214, the ACPI tables 214 specify the addresses of the register blocks. When the operating system 200 executes, the ACPI tables 218 can be accessed.

The ACPI operating environment shown in FIG. 2 migrates much of the functionality previously accomplished in computer system hardware of FIG. 1 and its system BIOS 216 into the overall operating system. Nevertheless, the operating system 200 operates in a hardware-independent mode. Thus, interrupts and many other hardware signals are mapped to software-readable ACPI registers 214 according to the Advanced Configuration Power Interface specification, so that whatever ACPI-aware operating system has control may detect signals to appropriate portions of the computer system of FIG. 1.

As a result, general hardware ports exist within the input/output space of the host computer system. The operating system 200 and other software running on the host processor 30 reads ACPI registers 214 in the port space as though from a memory location. Flexibility of system layout is retained by the platform manufacturer, since ACPI-compliant systems create a data structure object in memory for each device in the system, containing any drivers or parameters useful to the host system in operating the device.

The ACPI specification defines various power states for the computer system S, and for various devices within the computer system S. Devices may be placed in different power states as needed. For example, ACPI compliant portions of the computer system S may operate when in a "S0" or normal-operate state, but are completely shut down and without power when in a "S3" state. There is also an S4 state for ACPI-compliant portions of the computer system S, described below.

In an S1 or S2 state, the hardware platform of the computer system S is in a low power state, referred to as "sleep" state respectfully, in which very little processing is performed. Such states are particularly useful in mobile or portable computer systems, since power consumption is a dominant concern. Intermediate power states such as S1, S2 or S3 allow the computer system S to respond to particular interrupts, such as a remote access request, a telephone call, or a user pressing a key on a keyboard, without requiring the power needs of a fully-operating system.

Similarly, devices have various power states in an ACPI environment. Devices may be placed in a fully-operational "D0" state, a low power or "Device Off" state referred to as "D3" state, or either of two vendor-defined intermediate states known as "D1" and "D2." Some devices are known as "waking" devices. A waking device is a device capable of generating an interrupt that can cause the computer system to transition from a very low power state such as the S4 state to a fully operational S0 state.

ACPI defines a system S4 state for ACPI-compliant portions of the system S. The S4 state is an extremely low power state for a computer system. The behavior of the S4 state is defined such that processors are not executing instructions except that devices capable of waking the system from the D4 state are initialized and enabled for transitioning the system to state S0. A transition from S4 to S0 causes the processor 30 to begin execution at its boot location.

The S4 sleeping state is the lowest power, longest wakeup latency sleeping state supported by ACPI. The ACPI-compliant device portions of system S are disabled from power, and yet maintained in platform context. The mechanism initiated by the operating system for entry into the S4 state requires the operating system driver to write "sleep type" fields and set the "sleep enable" bit. These are defined for ACPI-compliant systems. The mechanism initiated by BIOS 216 for entry into the S4 state requires the operating system to transfer control to the BIOS 216 according to the ACPI specification for ACPI-compliant hardware platforms. These values are specified in ACPI Tables 218 defined for ACPI systems. When the BIOS 216 has control, appropriate memory and chip set context are saved, the platform is placed in the S4 state and power is disabled to all devices, and appropriate values are written to the appropriate wake status registers according to the ACPI specification.

The embedded microcontroller 300 (FIG. 3) on super I/O chip 62 in the computer system S provides run time event signals on line 302 (NOTE: label 302 and 304 in FIG. 3) to a general purpose input on the ISA bridge 24. When the ISA bridge 24 is a PIIX4 bridge, the run time event signals are furnished to General Purpose Input 01. Similarly, the embedded microcontroller 300 provides wakeup event signals on line 304 to a general purpose input on the ISA bridge 24. In the case of the PIIX4 bridge, the wakeup event signals are furnished to General Purpose Input 11.

The embedded microcontroller 300 toggles or changes the state of the runtime event signal on line 302 to ISA bridge 24 on the occurrence of the following events:

1. In the event of a power resource change (i.e., from AC to DC or DC to AC).
2. On the insertion or removal of a battery from power supply to the computer system S.
3. On occurrence of a thermal event, i.e., sensing that the computer system S is running at too high a temperature and the operating system needs to be notified to take appropriate corrective action.

4. On the insertion or removal of a device in the computer system S, such as a floppy disk in disk drive 74.

The embedded microcontroller 300 also toggles or changes state of the wakeup signal on line 304 to ISA bridge 24 on the occurrence of one of the following events:

1. The sleep button is pressed by the user on keyboard 68 so that the computer system S is to be placed into a sleep state.
2. The sleep button is depressed on keyboard 68 to indicate that the user desires to wakeup the computer system S.
3. A low threshold level is detected in the battery for the computer system S so that the embedded controller 300 needs to wake up the computer system S and ask the operating system to perform appropriate power conservation or saving strategies.
4. A PCMCIA adapter card is either being inserted or removed from the PCMCIA slot, in the computer system S.

According to the ACPI Specification, included among the ACPI registers 210 are a power management control register or PM1a control register 310 and a power management or PM1b control register 312. When the ISA bridge 24 is a PIIX4 bridge, PM1a control register 310 is accessible on Input/Output port 2004 and PM1b control register 312 is accessible on Input/Output port 5004. For other types of computer systems and ISA bridges, the PM1a and PM1b control registers may be located at other appropriate locations in the computer system S.

Each of the PM1a and PM1b control registers 310 and 312 preferably are configured as shown in FIG. 4. Bit 0 is the SCI enable (SCI_EN) bit. Bit 1 is the Bus Master Reload Enable bit. Bit 2 is the Global Release bit. Bits 3 through 9 are reserved. Bits 10 through 12 define the suspend type (SUS_TYP) field to be described below. Bit 13 is the Suspend Enable (SUS_EN) bit, while bits 14 and 15 are reserved.

For the PIIX4 bridge 24 in the disclosed embodiment, bits 12–10 of the SUS_TYP field are defined in Table I as follows:

| Bits 12-10 | Definition |
|---|---|
| 000 | Soft OFF or suspend to disk |
| 001 | Suspend to RAM (STR) |
| 010 | POSCL (Powered On Suspend, Context Lost) |
| 011 | POSCCL (Powered On Suspend, CPU Context Lost) |
| 100 | POS (Powered On Suspend, Context Maintained) |
| 101 | Working (clock control) |
| 110 | Reserved |
| 111 | Reserved |

Figure 5:
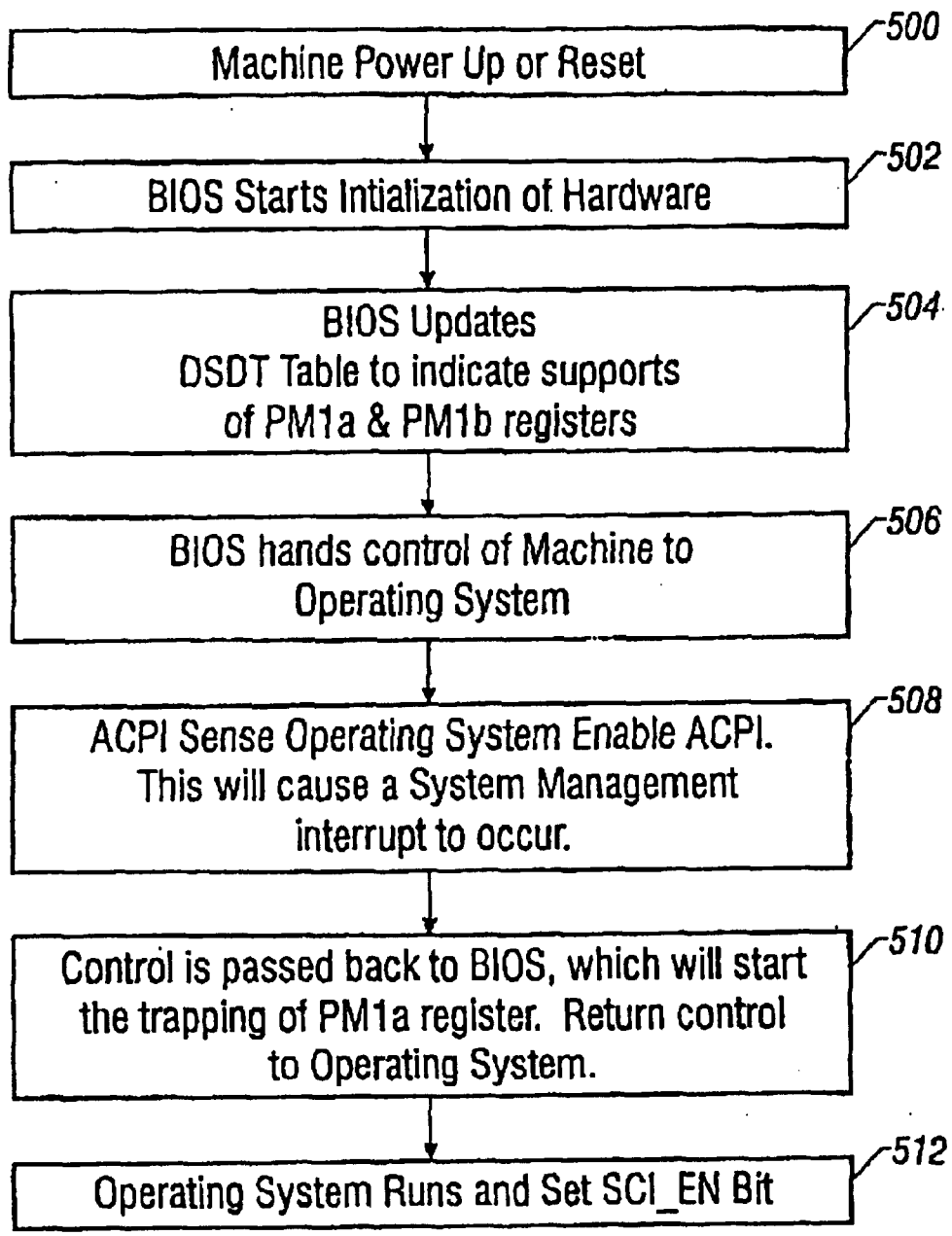
FIGS. 5, 6, and 7A–B are flow charts depicting the operation of a computer system according to the preferred embodiment of the present invention.

FIG. 5 illustrates the steps performed during the initialization process of the computer system S according to the preferred embodiment of the present invention. During step 500, the system processor receives an indication that the computer system has been powered up or reset. In response, the BIOS 216 in step 502 begins initialization of the platform hardware in the system S. Next, the BIOS updates the DSDT table (Note—insert full name of table) to indicate support of power management control registers PM1a and PM1b, which are shown as registers 310 and 312 in FIG. 3. In step 506 the BIOS 216 transfers control to the operating system, which the OSPM code 200.

Operation of the computer system S continues in the normal manner until the ACPI operating system is notified of an Operating System Enable. This causes the ACPI to generate a System Management Interrupt as shown in step 508. In response to the System Management Interrupt, the BIOS 216 in step 510 again receives control of the computer system S. At this point, the BIOS 216 begins trapping of the PM1a register 310, as described below with reference to FIG. 6. It should be understood, however, that the trapping function performed during step 510 can also be enabled during the performance of step 504 set forth above. After the performance of step 510, control is transferred back to the operating system 200. Then, during step 512, the operating system 200 runs, and sits the SCI_EN bit to 0 in control registers 310 and 312. The computer system S then operates in its normal manner according to the operating system 200 until the occurrence of either a run time event or a wakeup event as indicated by an appropriate signal to ISA bridge 24, as described above with reference to FIG. 3.

Figure 6:
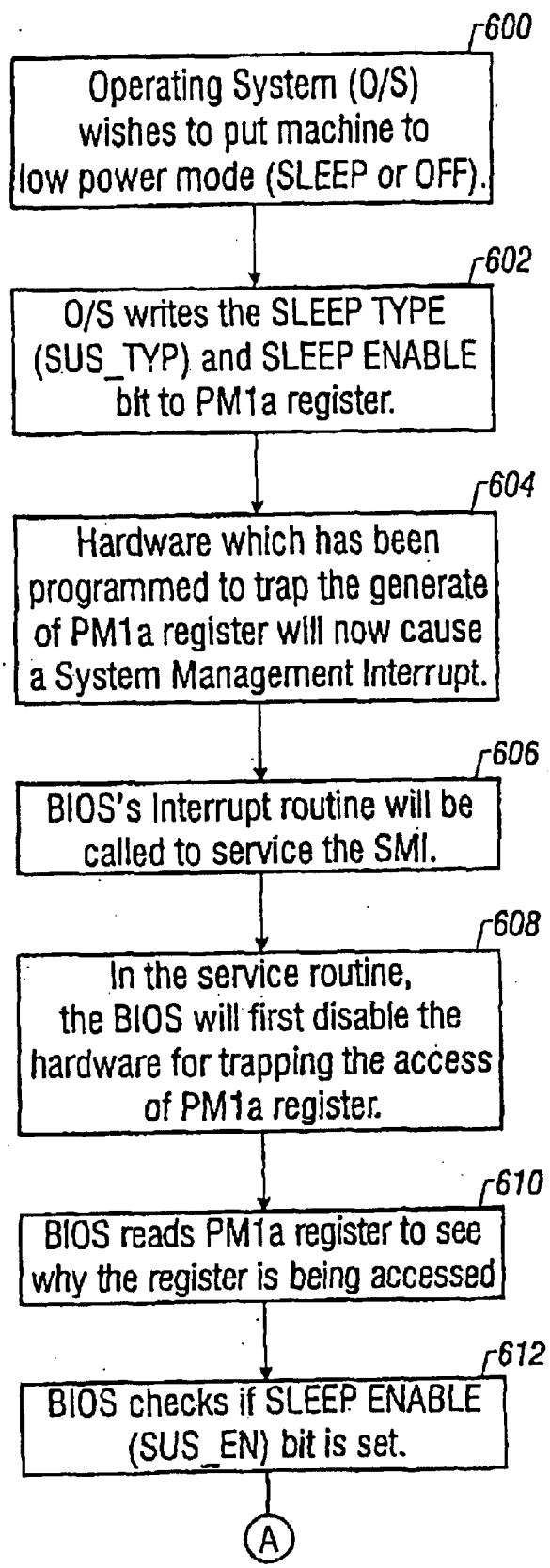
Figure 6:
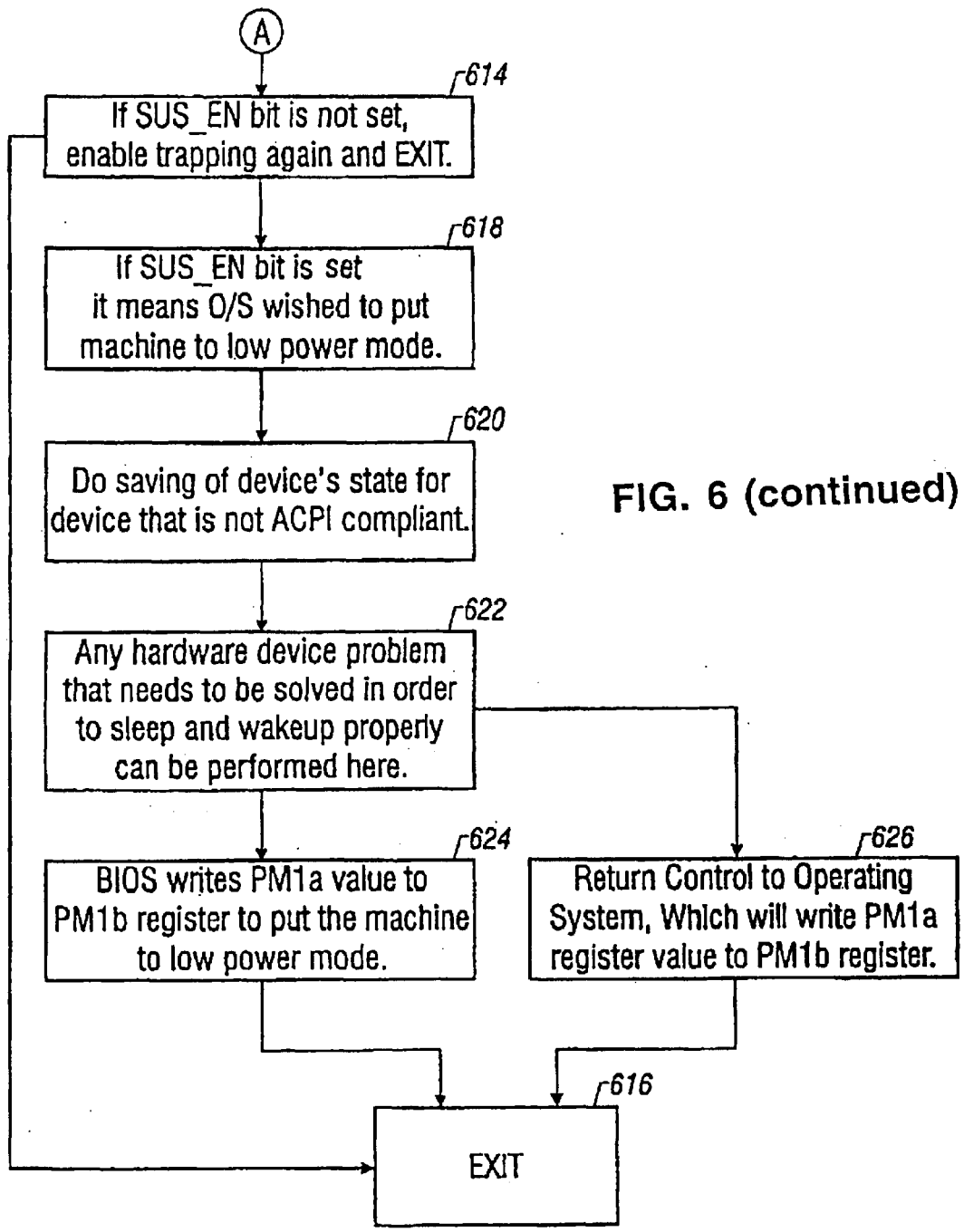

Turning now to FIG. 6, the process of performing machine specific tasks before the ACPI operating system 212 powers down is shown. This occurs to put the computer system S to a lower power state. At step 600 the receives an indication that the operating system 200 wishes to place the computer system S into a lower power mode (either sleep or off). In response, the ACPI Operating System ACPI Driver 206 writes the sleep type (SUS_TYPE) and the Sleep Enable Bit to PM1a register 310 in step 602. In step 604, the hardware that has been programmed to trap access the PM1a register 310, generates a System Management Interrupt in response to the new register settings.

Next, during step 606, the interrupt routine of the ACPI BIOS 212 is called to service the System Management Interrupt generated during step 604. In step 608 the ACPI BIOS 212 disables the hardware that is trapping the PM1a register 310. Next, the ACPI BIOS 212 reads the SUS_TYP field of the PM1a register 310 to determine why register 310 was accessed. Next, in step 612, the ACPI BIOS 212 checks if the sleep enable (SUS_EN) bit has been set. If the ACPI BIOS determines in step 614 that the SUS_EN bit was not set, trapping is again enabled and to the routine branches to an EXIT instruction 616.

If, however, during step 614 the ACPI BIOS determines that the SUS_EN bit was set, this is interpreted as an indication that the operating system desired the computer system S to enter a lower power mode, as shown in step 618. During step 620, the various devices in the computer system S that are not ACPI compliant have their present state stored in an appropriate register memory location. Then, any hardware device problem that needs to be solved in order to place the computer system in either the sleep or wakeup state properly can be performed in step 622. After performance of step 622, the ACPI BIOS 212 writes the value of the signal communicated to PM1a register 310 into PM1b register 312. The computer system S then moves to the lower power mode during step 624. Alternatively, step 626 can be performed and control of the computer system S transferred back to the operating system 200 to cause transfer or writing of the contents of PM1a register 310 values to be written to PM1b register 312 under control of the operating system 200. After performance of either step 624 or 626, the EXIT instruction 616 executes.

Although the process described herein generally applies to all sleep states, some additional considerations are desired when transferring from the S0 to S1 state. These additional considerations arise from the difference in the power state architecture between the S1 state and the non-S1 states. For the sleeping states other than the S1 state, the host processor 30 (CPU) is completely off and thus the CPU context is lost. Hence, information such as the instruction pointer (IP) and code segment pointer (CS), is stored either in the wakeup vector of the RAM or on the hard disk. For the S1 state, however, the CPU remains partially on, and the IP and CS remain in the CPU. Therefore, the system interrupt which occurs before the transition to a sleeping state will have a different effect on the operation of the operating system 200 after waking up from an S1 state versus a non-S1 sleep state. For wakeup from the S1 state, the operating system 200 will continue from the last instruction before the occurrence of the system interrupt; for the wakeup from a non-S1 sleep state, however, the operating system 200 will not continue from the last-completed instruction, but instead will resume from the wakeup vector as specified in the ACPI.

The effect this difference has on the computer system S during the wakeup from the S1 sleep state can be shown by relating to the process flow shown in FIG. 6. When the system wishes to move to the S1 state ("Powered on Suspend, Context Maintained" state), the IP and CS in the CPU will be pointed to the instruction to write the sleep type (SUS_TYP) and sleep enable bit (SUS_EN) to the PM1a register in step 602. Because the PM1b register has been declared by the BIOS 216 to the ACPI operating system 200 during the initial configuration, the CPU will also point to the instruction to write the same sleep type (SUS_TYP) and sleep enable bit (SUS_EN) to the PM1b register. The instruction to write to the PM1b register, however, will not be executed at this stage because the hardware trapping mechanism setup by the ACPI BIOS 212 will cause the System Management Interrupt to interrupt the operation of the operating system 200 in step 604 after it has written to PM1a, but before it has had a chance to write to PM1b. The remainder of the steps 606 through 626 then are followed until the BIOS 212 eventually writes the PM1a value to PM1b register to put the machine to the S1 sleep mode in step 624.

When the machine wakes up from the S1 sleep mode, control is sent back to the operating system 200. Because the portion of the CPU containing the instructional pointer (IP) and the code segment pointer (CS) was on during the sleep state, the operating system 200 will attempt to continue from the last instruction executed before going into the S1 sleep mode. The last instruction executed by the operating system 200 before going into the S1 state was writing the sleep type (SUS_TYP) and sleep enable bit (SUS_EN) into the PM1a register. Therefore, it will now write the same information into the PM1b register and put the system back into the sleep mode immediately after the machine wakes up from the sleeping mode. This is not the desired result.

To avoid this result, a new code for SUS_TYP is declared which is not recognized by the PIIX4 ISA bridge 24 as defined in Table I above. In Table I, the code for "Powered on Suspend, Context Maintained" state or S1 state is "04h". Therefore, a new code such as "06h" or "07h" is selected for use in the present invention. Because the new code 06h or 07h is not recognized by the PIIX4, when the operating system 200 executes the instruction to write the 06h or 07h value into the PM1b register after waking up from the S1 state, no change in the power state occurs.

Figure 7A:
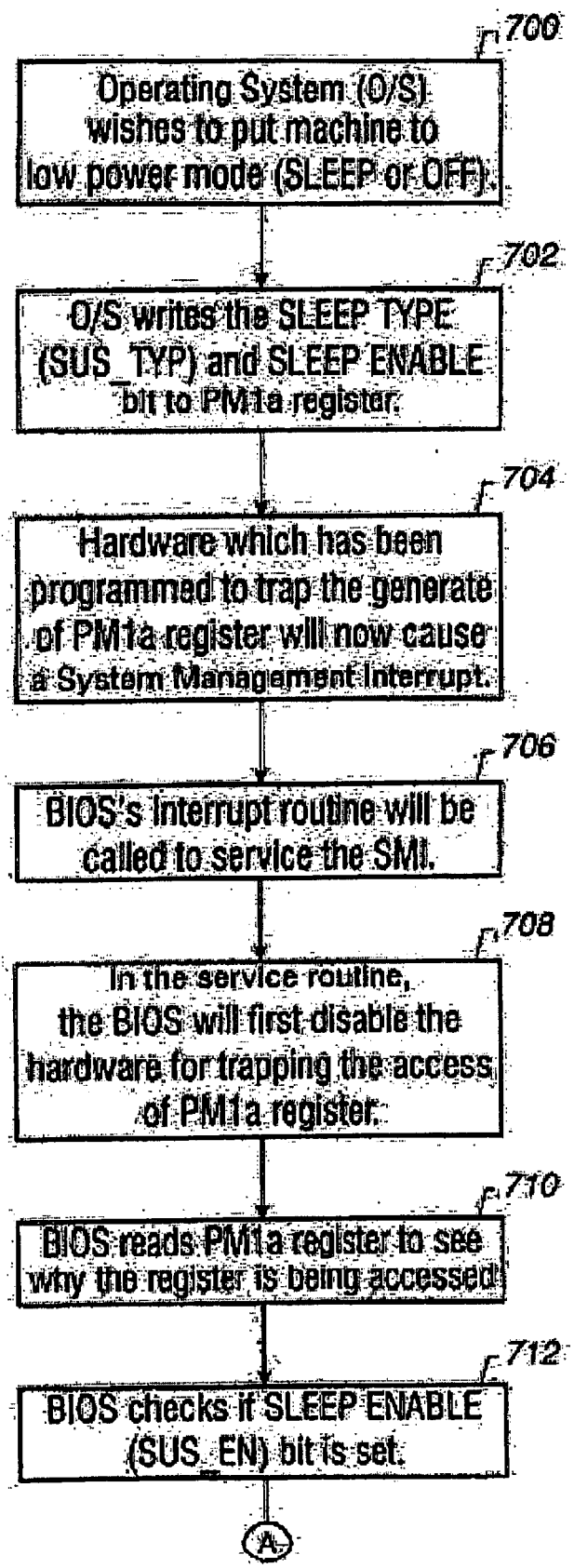
Figure 7B:
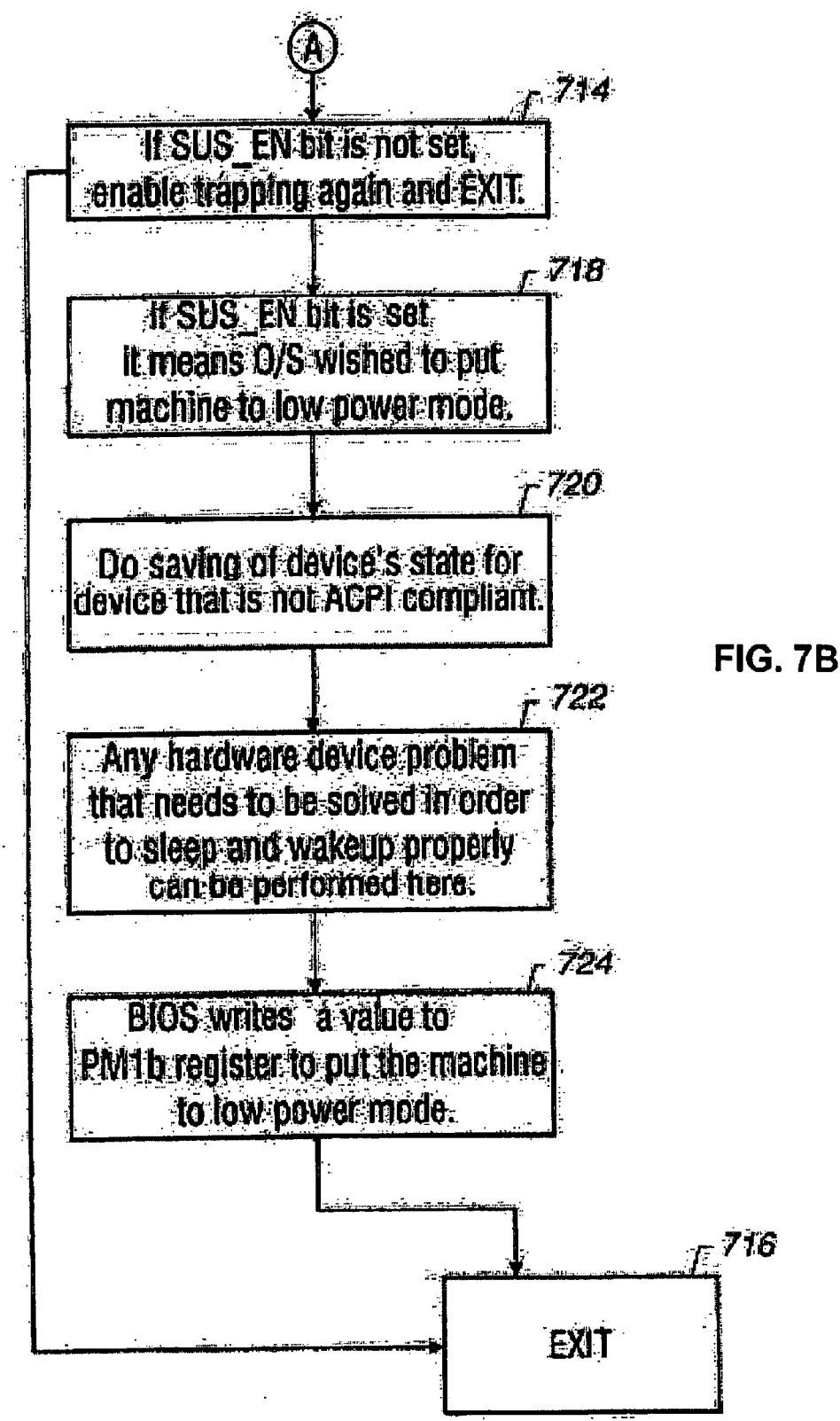

To illustrate the above method in greater detail, FIG. 7 shows the process of performing machine specific tasks before going to the S1 state. Now referring to FIG. 7, at step 700 an indication is received that the operating system 200 wishes to place the computer system S into the S1 sleep state. In step 702, the ACPI Driver 206 writes the sleep type (SUS_TYPE) and the Sleep Enable Bit to PM1a register 310. Although the SUS_TYPE code for the S1 state is defined to be 04h by the PIIX4 bridge 24, a new value 06h or 07h which has been declared in the ACPI Tables 214 is entered. At this point, the CPU will point to another instruction to enter the value 06h or 07h in the PM1b register. However, this instruction code is not executed by the operating system 200 because control is transferred to step 704 which causes the hardware which has been programmed to trap access of the PM1a register 310 to now generate a System Management Interrupt. The pointers to the instruction code for a write to the PM1b register, however, remain in the CPU to be executed when control returns to the operating system 200.

Next, during step 706 the interrupt routine of the ACPI BIOS 212 is called to service the System Management Interrupt generated during step 704. In step 708, the BIOS 212 disables the hardware that traps accesses to the PM1a register 310. In step 710, BIOS 212 reads the SUS_TYP field to see why PM1a register 10 is being accessed. Here, the 06h or 07h value would indicate to the BIOS that the system wishes to move into the S1 state. In the case of the S1 power state, the value to be entered into the PM1b register by the BIOS 212 is not the same value as the one which was entered into the PM1a register, which, in this case, was 06h or 07h. This is because the value 06h or 07h is not recognized by the PIIX4, but the system still needs to be put into the S1 sleep state. Hence, the value to be entered by the BIOS is the one which is actually defined by the PIIX4 for the S1 sleep state in Table I above, which, in this case, is 04h.

Next, in step 712, the BIOS checks if the sleep enable (SUS_EN) bit is set, and in step 718, determines that the operating system 200 wishes to put the machine to a lower power mode. During step 720, the various devices in the computer system S that are not ACPI compliant have their present state stored in an appropriate register memory location. In step 722, any hardware device problem that needs to be solved in order to place the computer system in either the sleep or wakeup state properly can be performed. After performance of step 722, the BIOS 212 writes the value 04h into the PM1b register 312. The computer system S is then put in the S1 power mode during a step 724.

During the S1 sleep stage, the portion of the CPU which contains the instruction pointer and code segment pointer remains on. When the system S wakes up from the S1 sleep state, the ACPI BIOS 212 performs a machine-specific restoration to address any hardware device problems relating to the wakeup. Then control returns to the operating system 200. The operating system 200 executes the next instruction pointed to by the IP and CS in the CPU, which is to write the value 06h or 07h to the PM1b register 312. The value 06h or 07h has no meaning for the PIIX4 bridge 24 and so no hardware action occurs. Thus, the computer system S successfully remains in the wakeup mode.

In the operation of the present invention, changing the computer system S from one power-state to another is generally a function commanded by the operating system 200. Under ACPI, the operating system determines, either upon a software signal such as from an application program 202 (FIG. 2) running on the host processor module 30 (FIG. 1), or upon a hardware signal that power is to be disabled from the computer system S.

Hardware-generated power state transitions include, for example, power button, sleep button, power override button sequence, real-time clock alarm, lid switch, thermal control, AC adapter, and docking sequences. Also, sleep/wake control logic, legacy/ACPI select, and various power control logic can generate power-state transition commands. These typically conform to fixed feature programming models, although some may be generic events, and reside on the host system.

The operating system 200 responds by providing a "prepare to sleep" signal that includes transmission of a suspend enable (SUS_EN) field and a suspend type (SUS_TYP) signal to all devices in the computer system S, thus indicating a command to enter a low power state and the particular low power state, respectively. The devices respond by performing custodial or "housekeeping" functions as necessary. Housekeeping functions typically include storing context data in nonvolatile memory; unloading applications, closing files; recording or storing clock program counter and various timer states; and enabling "wake enabled" devices.

Briefly, the present invention allows ACPI to be extended to define power management for processors outside the ACPI space as well as processors within the ACPI space. This is accomplished by using the "PM1b control" register 312 to cover the power management state of embedded microcontroller 300. The techniques described above may also be extended to other embedded controllers in a non-ACPI processor, or otherwise not defined within the ACPI space of the system.

According to the present invention, regardless of the operating system, both the PM1a and PM1b control registers 310 and 312 are declared upon initial configuration. The PM1b control register 312 is driven by the PM1a control register 310, and "traps" or detects signals to the PM1a control register and transactions accordingly. BIOS 230 (Note: this number is not used in FIG. 2) (1) traps on every access to the PM1a control register, (2) checks the reason for the operating system access of the register, and (3) when the corresponding enable bit is set, indicates to the microcontroller 300 to shut down or enter a low power mode. Thus, an exchange of information between the various processors is accomplished before entering the low-power state. Both the PM1a and the PM1b control registers are placed in the appropriate state and the microcontroller 300 is given a signal in response to the ACPI defined "Prepare-to-Sleep" command. The microcontroller 300 returns an acknowledge, whereupon the operating system writes the same sleep command to the PM1b control register 312, shutting down or putting to sleep the host processor 30.

Declaring both the PM1a and PM1b registers 310 and 312, and providing the microcontroller 300 with a chance to either shut down or enter a low power mode whenever the operating system or BIOS 230 (Note: this number is not shown in figures) accesses the PM1a control register 310, provides several advantages. Primarily, synchronization is achieved between the main processor 30 and the microcontroller 300. Also, timing information can be exchanged over the interface bus 12. Additionally, the overall system can use non-volatile storage devices on the microcontroller 300 to save device states from the host systems before returning control to the operating system 200. Finally, preventing the continued operation of the microcontroller 300 when the host system is in a low power mode enhances system "coherency." The ability to resume subsequently from a known state is enhanced, since the microcontroller 300 cannot have altered the state while the host processor 30 was in the low power mode. Additional processes can be run for shutting down the system when some of the device-saving routines can be off-loaded to a processor on the microcontroller 300.

Legacy (i.e., non-ACPI) operations are also supported. The ACPI specification requires the BIOS 216 to determine whether the operating system is ACPI-compliant by checking whether system control interrupts are enabled, as indicated by a nonvolatile SCI_EN bit. Because SCI events are available only in ACPI operating environments, ACPI-compliant hardware platforms automatically map SCI events to system management interrupt (SMI) events readable by BIOS 216. Because legacy operating systems run on ACPI-compliant hardware in which SCI events are mapped to SMI events, the PMIb control register 312 remains accessible even to the legacy operating systems. Consequently, the embedded controller 300 can "wake" the host processor 30 and can exchange information with secondary processors on the host system, even while the primary host processor 30 is in a low-power mode.

When the host processor 30 enters a low-power mode, including a sleep state, the computer system BIOS traps the corresponding access to the PM1a control register 310. The present invention then invokes a method on the host system which exchanges information between the host and embedded processors. The present invention determines that the power-management register access is to reduce power in the host system. The present invention also ensures that, when mapping SCI events to SMI events, the ACPI operating system shut-down procedures allow the microcontroller 300 to wake the host system even if a legacy operating system is all that is available on re-boot.

With the present invention, it can be seen that synchronization is achieved between the main processor 30 and the embedded microcontroller 300 during transition to a low power state. In addition, the ACPI BIOS 212 is able to save the status of those non-ACPI compliant portion of the computer system S before returning control to the operating system. The microcontroller 300 is able to either shut down completely or go to a low power mode before such a return occurs. Thus, when the system S is returned to a wake state, it returns to a known state during the resume process.

The foregoing disclosure and description of the invention are illustrative and explanatory thereof, and various changes in number of variables, number of parameters, order of steps, field sizes, data types, code elements, code size, connections, components, and materials, as well as in the details of the illustrated hardware and software and construction and method of operation may be made without departing from the spirit of the invention.

What is claimed is:

1. A computer system comprising:

a host processor under control of an operating system and a basic input/output system having a plurality of states, said states comprising an operating and at least one low power state;

a memory device storing the basic input/output system and the operating system for the host processor, the basic input/output systems containing code to cause the host processor to transition on request to a different state;

a first power management control register to receive the state of the host processor;

a bridge coupled to the host processor;

an I/O chip for connecting selected inputs to the bridge;

a microcontroller in the I/O chip for providing signals to the bridge from the selected inputs during operation of the computer system;

a second power management control register to store the state of the input/output chip microcontroller;

the basic input/output system for the first host processor containing code to notify the input/output chip microcontroller when the processor is to transition to a different power state.

2. The computer of claim 1, further including:

the basic input/output system further causing the input/output chip microcontroller to transition to a like power state to that of the processor when the first processor transitions to a different power state.

3. The computer of claim 1, further including:

the basic input/output system further causing the input/output chip microcontroller to shut down the first processor transitions to a different power state.

4. The computer system of claim 3, further including:

the basic input output system further causing the input/output chip microcontroller to transition to a like power state to that of the host processor when the host processor transitions to a different power state.

5. The computer system of claim 1, wherein:
said states of the host processor include a plurality of low power states of differing levels of power consumption.

6. The computer system of claim 1, wherein:
the input/output chip provides ran time event signals to the bridge during operation of the computer system.

7. The computer system of claim 1, wherein:
the input/output chip provides wakeup event signals to the bridge during operation of the computer system.

8. The computer system of claim 1, wherein:
the first power management register contains bits indicating the type of state of the host processor.

9. The computer system of claim 8, wherein:
said bits indicating the type of state of the host processor are not recognized by the bridge.

10. The computer system of claim 1, wherein:
the second power management register contains bits indicating the type of state of the input/output microcontroller processor.

11. The computer system of claim 10 wherein:
said bits indicating the type of state of the input/output microcontroller processor are not recognized by the bridge.

12. The computer system of claim 1, wherein:
the first power management register contains bits indicating the type of state of the host processor; and
the second power management register contains bits indicating the type of state of the input/output microcontroller processor.

13. The computer system of claim 1, wherein the host processor and its operating system are compatible with the advanced configuration and power interface specification.

14. The computer system of claim 1, further including:
a bus;
at least one peripheral device operating under control of the host processor and the operating system;
a first power management control register to store the state of the host processor;
a bridge coupled to the host processor;
an input/output chip for connecting selected inputs to the bridge;
a microcontroller in the input/output chip for providing signals to the bridge from the selected inputs during operation of the computer system;
a second power management control register to store the state of the input/output chip microcontroller;
the basic input output system for the host processor containing code to notify the peripheral device to perform a custodial function when the host processor is to transition to a different power state.

15. A computer system, comprising:
a host processor under control of an operating system and a basic input/output system and having a plurality of states, said states comprising an operating and at least one low power state;
a memory device storing the basic input/output system and the operating system for the host processor, the basic input/output system containing code to cause the host processor to transition on request to a different state;
a bus;
at least one peripheral device operating under control of the host processor and the operating system;
a first power management control register to store the state of the host processor;
a bridge coupled to the host processor;
an input/output chip for connecting selected inputs to the bridge;
a microcontroller in the input/output chip for providing signals to the bridge from the selected inputs during operation of the computer system;
a second power management control register to store the state of the input/output chip microcontroller;
the basic input output system for the host processor containing code to notify the peripheral device to perform a custodial function when the host processor is to transition to a different power state.

16. The computer system of claim 15, wherein the peripheral device responds to notification from the host processor and performs the custodial function.

17. The computer system of claim 16, wherein the custodial function comprises storing data.

18. The computer system of claim 16, wherein the custodial function comprises storing clock information.

19. The computer system of claim 16, wherein the custodial function comprises unloading applications.

20. The computer system of claim 16, wherein the custodial function comprises closing files.

21. The computer system of claim 16, wherein the peripheral device is a wake-enabled device and wherein the custodial function comprises enabling the wake-enabled device.

* * * * *